United States Patent [19]
Hansen

[11] Patent Number: 5,161,915
[45] Date of Patent: Nov. 10, 1992

[54] SYNTHETIC COVER FOR WASTE PILES
[75] Inventor: David L. Hansen, Averill Park, N.Y.
[73] Assignee: Landfill Service Corporation, Apalachin, N.Y.
[21] Appl. No.: 674,864
[22] Filed: Mar. 25, 1991
[51] Int. Cl.⁵ ................................................ B09B 1/00
[52] U.S. Cl. ..................................... 405/129; 405/128; 405/264; 405/266; 588/249
[58] Field of Search ............... 405/128, 129, 258, 263, 405/264, 266; 47/9; 106/706, 718, 901; 588/249

[56] References Cited

U.S. PATENT DOCUMENTS

| | | | |
|---|---|---|---|
| 2,802,303 | 8/1957 | Weeks | 47/9 |
| 3,466,873 | 9/1989 | Present | 61/35 |
| 3,635,742 | 1/1972 | Fujimasu | 405/264 X |
| 4,028,130 | 6/1977 | Webster et al. | 106/120 |
| 4,297,810 | 11/1981 | Hansford | 47/9 |
| 4,354,876 | 10/1982 | Webster | 405/128 X |
| 4,369,054 | 1/1983 | Shinholster, Jr. et al. | 71/25 |
| 4,374,672 | 2/1983 | Funston et al. | 106/97 |
| 4,519,338 | 5/1985 | Kramer et al. | 118/305 |
| 4,790,691 | 12/1988 | Freed | 405/263 |
| 4,950,426 | 8/1990 | Markowitz et al. | 405/129 X |
| 4,973,196 | 11/1990 | Fuhr et al. | 405/129 |
| 5,040,920 | 8/1991 | Forrester | 405/129 |

FOREIGN PATENT DOCUMENTS 3347377  7/1985  Fed. Rep. of Germany ...... 405/129

Primary Examiner—David H. Corbin
Attorney, Agent, or Firm—Heslin & Rothenberg

[57] ABSTRACT

A synthetic cover for waste piles may be formed from a mixture of liquid, binder, cellulose fibers and plastic fibers. These constituents may be mixed and applied to cover a waste pile. The cover will harden to minimize odor and affinity to birds, flies and other insects. The liquid may include water; the binder may include cement kiln dust with or without bentonite, or portland cement with flyash or stone dust. The cellulose fibers may comprise shredded paper or wood.

34 Claims, No Drawings

SYNTHETIC COVER FOR WASTE PILES

BACKGROUND OF THE INVENTION

This invention relates to the field of waste management. More particularly, the invention relates to a synthetic cover for waste piles.

During the processing or storage of waste, waste may be concentrated into piles within landfills, compost windows, sludge heaps, etc. When waste is concentrated into piles, it is often necessary to cover waste piles to minimize their odor, prevent fires, prevent the movement of the waste, and prevent vectors such as birds, flies, and other insects from feeding thereon. Typically, waste piles are covered by spreading a layer of dirt over the exposed portions of the waste piles. For example, in landfills, piles of municipal solid waste are covered by spreading a layer of dirt thereon. The thickness of the layer depends upon the length of time the pile is to remain covered. For example, a waste pile which is to be covered for a short period of time, for example, overnight, may require, for example, a six-inch layer. However, when it is necessary to cover a waste pile for a relatively longer period of time, a twelve-inch layer may be required. For a permanent cover generally a layer of dirt of approximately two foot thickness or more may be required.

One problem associated with the use of soil and dirt is that large quantities are necessary to cover these waste piles. For this reason, there is a high loss of available volume for waste thereby significantly reducing the amount of waste which can be concentrated into a pile. This is particularly true in landfills where waste piles are stacked upon other waste piles having daily soil covers separating each waste pile. Since there is concern over the effective space available in existing landfills, it has become necessary to maximize the volume available for waste. One way of accomplishing this is to minimize the volume of dirt necessary for covering the waste piles.

Besides soil, certain chemical foam products have been developed and used to cover waste piles. However, these products are relatively expensive and very difficult to apply. Also, the safety of these chemical formulations has been questioned and their effect upon ground water quality remains unknown.

It is therefore an object of the present invention to provide a cover for waste piles which takes up a minimal amount of volume.

It is also an object of the present invention to provide a cover for waste piles which is derived from readily available, preferably recycled, materials.

It is also an object of the present invention to provide a cover for waste piles which causes no harm or threat to the environment.

It is also an object of the present invention to provide a cover for waste piles which is easily applied.

SUMMARY OF THE INVENTION

The aforementioned objects are achieved by utilizing the synthetic cover for waste piles in accordance with the present invention.

The invention includes a mixture for creating a synthetic cover for waste piles. The mixture comprises a liquid, a binder, cellulose fibers, and plastic fibers. The invention also incorporates a method of making a synthetic cover for waste piles comprising mixing cellulose fibers and plastic fibers with a liquid to form a pre-mixture, and mixing a binder reagent to form a final mixture, wherein the final mixture has a thick-viscous consistency which will harden after it is applied to cover waste piles.

The mixture may comprise approximately thirty eight percent to forty five percent by weight liquid, approximately fifty four percent to sixty percent by weight binder, approximately one half percent to two percent by weight cellulose fibers, and approximately one-tenth of a percent or less by weight plastic fibers.

The liquid may comprise water, landfill leachate, and/or industrial waste water. The binder may comprise cement kiln dust; and/or cement kiln dust with bentonite. The amount of bentonite may be approximately five percent, by weight of the total mixture. Also, the binder may comprise fly ash, and/or fly ash with portland cement. The amount of portland cement may comprise about ten to fifteen percent of the mixture, by weight. The cellulose fibers may include shredded paper and/or finely shredded wood fibers. The plastic fibers may comprise polyethylene terephthalate fiber.

The invention also incorporates a method of covering waste piles comprising mixing a binder, cellulose fibers, plastic fibers and liquid together to form a mixture; coating a waste pile with the mixture; and allowing the coating to harden as a cover on the waste pile. The mixing of the binder, cellulose fibers, plastic fibers and liquid may comprise mixing cellulose fibers and plastic fibers into a liquid; thereafter, adding the binder thereto; and mixing the binder therein. Mixing the fibers, liquid and binder may occur within a mixing tank. The coating of a waste pile with the mixture may comprise spraying the mixture on the waste pile.

DETAILED DESCRIPTION

The synthetic cover for waste piles in accordance with the present invention may be used to cover a variety of waste piles such as, for example, composte windows, sludge heaps, and municipal solid waste piles in landfills. However, implementation of the synthetic cover for waste piles will be described in conjunction with its use to cover municipal solid waste piles in landfills.

Since municipal solid waste piles in landfills are relatively large, it is necessary to cover a large area of the surface of these piles using the synthetic cover in accordance with the present invention. Accordingly, it is necessary to provide an apparatus which is capable of applying the synthetic cover to a large area and providing a system which is capable of generating and applying large volumes of the material used to form the available equipment may be used to mix and apply the ingredients ("constituents") necessary to produce the synthetic cover in accordance with the present invention. A typical applicator contains a mixing tank with an agitator, a liquid pump capable of passing a high content of solid material therethrough, and a spray hose with a nozzle. The capacity of the mixing tanks ranges from approximately 500 to 3,000 gallons. Typically, the agitator and pump are powered by a diesel or gasoline engine. The entire applicator apparatus may be mounted on a trailer that could be towed by a truck or other powered means. Alternatively, the applicator apparatus may be mounted on the bed of a truck or mounted on a track unit to be guided to different areas of the landfill. Although the synthetic cover for waste piles has been effectively mixed and applied using applicator equipment, it is possible to mix the ingredients to form the synthetic cover in other types of mixing equipment which have a sufficient mixing and spraying capacity.

The synthetic cover for waste piles in accordance with the present invention is mixed by filling the mixing tank with a predetermined amount of liquid constituent such as water, landfill leachate, or industrial waste water. The proper amount of cellulose fibers and plastic fibers are then loaded into the mixer containing the liquid. Optionally, a coloring agent, such as LANSCO ® (Landers Segal Color Corp) "Earthtone" mortar dye may be added if desired. The agitator is activated such that the cellulose fibers and plastic fibers are mixed with the liquid. Typically, it is necessary to activate the agitator for approximately a minute or longer to adequately mix the liquid, cellulose and plastic fibers together. The binder reagent is then placed into the mixer where it is thoroughly agitated with the liquid, cellulose fibers and plastic fibers.

The mixing time necessary to yield a mixture with the proper consistency may vary depending upon the percentage of each constituent added to the mixture. Also, weather conditions such as temperature and humidity may affect the length of time that the binder must be mixed with the liquid, cellulose fibers and plastic fibers. However, the materials should be mixed until the mixture has a thick, viscid, "milk shake" type consistency.

When the mixture is properly agitated, the spray applicator is moved to the working area and the mixture is sprayed onto the waste pile surface using a motion similar to spray painting. The mixture is sprayed in such a manner that a uniform layer approximately one-eighth to one-quarter of an inch thick exists. After the entire surface area of the waste pile has been sprayed in this manner, the material will harden if undisturbed. When the mixture is applied at the proper consistency it will resemble a clotty coagulant type of material which will adhere to the waste pile and cohere to itself. Typically, the material will dry and harden to resemble a stucco-type finish within 24 hours. After the entire waste pile has been covered, the applicator and mixing unit must be cleaned out thoroughly when not in use so that the mixture remaining within the apparatus does not harden. Typically, water will suffice in cleaning the apparatus. For convenience, cleaning may occur directly on the landfill itself.

The liquid portion of the mixture may include water, landfill leachate, and/or industrial waste water. Any quality of water is acceptable for use in the present invention, including turbid, polluted and/or non-potable waters as well as landfill leachate and industrial waste water. The amount of liquid should be between 38 and 45 percent, by weight, of the total mixture. The binder used in the mixture may include cement kiln dust, fly ash with portland cement, stone dust with portland cement, and/or cement kiln dust with bentonite. The amount of binder in the total mixture should be between 54 and 60 percent, by weight. The cellulose fiber may include shredded newspaper, shredded mixed paper, and/or finely shredded wood fiber. The total amount of the cellulose fiber in the mixture should be between $\frac{1}{2}$ and 2 percent, by weight. The plastic fiber which may be used within the mixture includes polyethelene terephthalate (PET) fibers or other plastic fibers including recycled plastics. The amount of plastic fiber used is in the mixture may be up to one-tenth of a percent, or less, of the mixture by weight.

The exact percentage of each constituent, (i.e. liquid, binder, cellulose fibers, plastic fibers) used to create the mixture may depend upon the weather conditions which exist during mixing and application of the synthetic cover. For example, at relatively higher temperatures, the amount of liquid used in the total mixture will be higher than the amount of liquid used at lower temperatures. However, the total amount of water used within the mixture should be between 38 and 45 percent despite such weather variations. Therefore, for example, on a relatively hot day, the amount of liquid used will be closer to 45 percent of the mixture, by weight. However, on a cold day, the amount of liquid will be closer to 38 percent of the mixture. Also, if there is a high degree of rainfall which will contact the mixture, then the amount of water used should be decreased accordingly.

The amount of binder used in the mixture will also be higher on a cold day compared to the amount of binder used in the mixture on a hot day. However, despite variations in rainfall and temperature, the amount of binder should remain between 54 and 60 percent of the total weight of the mixture. Therefore, on a hot day, the amount of binder will be closer to 54 percent of the total mixture, and on a cold day, the amount of binder will be closer to 60 percent of the total mixture. The amount of cellulose fiber used is also dependent upon rainfall. On a day where the rainfall is present, the amount of cellulose fiber should be closer to the 2 percent portion of the range of total weight of the mixture. Accordingly, the higher the rainfall, the higher the amount of cellulose fiber used. However, the amount of cellulose fiber should continue to remain between $\frac{1}{2}$ and 2 percent of the mixture, by weight. The amount of plastic fiber used in the mixture is not dependent upon changes in weather conditions.

The constituent used in liquid portion of the mixture may include water, landfill leachate, and/or industrial waste water. Although either of these three types of liquids will suffice, water is the preferred liquid constituent because it is easily available. Many different qualities of water may be used including turbid, polluted and non-potable water. Industrial waste water may also be used. These waste waters may be effective as a liquid constituent provided that they do not contain pollutants which react with other constituents during mixing. Landfill leachate, created by percolation of water through the buried refuse at a landfill, may also be used as a liquid constituent. Since disposal and treatment of landfill leachate are troublesome and expensive, use of landfill leachate may provide an effective method of its disposal. It should be noted that use of landfill leachate and industrial waste water as the liquid constituent may require increased safety precautions.

The constituents which may be used as cellulose fibers include shredded newspaper, mixed types of shredded paper and/or shredded wood fiber. These cellulose fiber constituents may be used separately or in various combinations. Preferably, shredded newspaper or shredded mixed waste paper should be used because of its absorbability and availability. Newspapers may be shredded into particles, preferably less than one-half inch in any dimension. In order to ensure proper liquid content in the total mixture, the shredded newspaper should not have more than a 6 percent, by weight, moisture content prior to mixing with the liquid constituent. Also, other finely shredded mixed papers useable as the cellulose fiber constituent should preferably be less than one-half inch in any dimension. These mixed paper fibers may include shredded magazines, phone books, corrugated containers, junk mail, office paper, etc. These shredded mixed papers should also be less than 6 percent by weight moisture content prior to mixing. Shredded wood fibers may also be used as a constituent provided that the wood fibers are finely shredded. The shredded wood fiber must be in a string or hair-like shape such as fine excelsior. Wood chips are not satisfactory for use as the cellulose fiber constituent.

The constituents which may be used as plastic fibers include high density polyethelene, polyvinyl chloride as well as or other types of plastics shredded into thin hair-like fibers. These hair-like fibers should be between one-quarter to one-half inch in length. Polyethelene terephthalate fibers, such as PETROFLEX ® type 401 fiber which are hair-like in diameter and between one-quarter to one-half inch long in length are preferred as the plastic constituent useable in the present invention. These fibers are manufactured from recycled products such as plastic soda containers.

The constituents which may be used as binders in the present invention include cement kiln dust (CKD), fly ash with portland cement, cement kiln dust with bentonite, or stone dust with portland cement. Cement kiln dust is the preferred binder used in the present invention. Cement kiln dust is captured during the manufacture of portland cement by air pollution control devices. Although the physical and chemical characteristics of cement kiln dust are much different than portland cement, cement kiln dust does bear a physical resemblance to portland cement. Although cement kiln dust is the preferred binder constituent, other pozzolonic binders may be used. Also, bentonite may also be added to cement kiln dust to form the binder constituent. The bentonite enhances the smoothness and consistency of the mixture and also increases its tacitness and viscosity enabling it to better adhere to waste and cohere to itself. Typically, approximately 5 percent, by weight of the total mixture, of bentonite may be added. However, it is usually not necessary or required to add bentonite with the cement kiln dust as the binder constituent.

Fly ash and portland cement may also be used as the binder constituent. Fly ash are fine solid particles of ashes, dust and soot which evolve from burning fuel. The amount of portland cement used with the fly ash should be approximately 10 to 15 percent by weight of the total mixture. In lieu of fly ash, stone dust, derived from commercial stone crushing operations, may be used along with portland cement as a binder constituent. Accordingly, the amount of portland cement used with stone dust should also be between 10 to 15 percent by weight of the total mixture.

Using the aforementioned materials as constituents will result in a mixture which may be applied, by spraying or another manner, to a waste pile to form a cover which will minimize odor and prevent vectors such as birds, flies and other insects from feeding off the waste.

TEST RESULTS

Test Results
TEST 1
A laboratory test was conducted utilizing the constituents and parameters shown in the following table.

| Constituent | Type | % age of Mixture by Weight | Weight |
| --- | --- | --- | --- |
| Liquid | Water | 45 | 125 gm |
| Binder | Cement Kiln Dust | 54 | 150 gm |
| Cellulose Fiber | Newsprint | <1.0 | 2.5 gm |
| Plastic Fiber | PETROFLEX ® type 401 Fiber | <.1 | .1 gm |

These amounts of constituents were mixed as discussed supra. The mixture was then applied as a cover on a small sample of refuse including paper, plastic and glass. The mixture was of a viscosity which properly adhered to the sample refuse.

TEST 2
A field test was conducted utilizing the constituents and parameters shown in the following table.

| Constituent | Type | % age of Mixture by Weight | Weight |
| --- | --- | --- | --- |
| Liquid | Water | 45 | 1,000 lbs |
| Binder | Cement Kiln Dust | 59 | 1,530 lbs |
| Cellulose Fiber | Shredded Newspaper | 2 | 50 |
| Plastic Fiber | PETROFLEX ® type 401 Fiber | <.1 | 1 |

The constituent amounts were mixed as discussed supra and the mixture was sprayed onto municipal solid waste using a Bowie Lancer 500 Hydromulcher ®. The mixture hardened into a cover which withstood freezing temperatures and various weather conditions.

Although the invention has been disclosed in relation to the embodiments described herein, it is apparent that various modifications, substitutions equivalents and other changes may be utilized without departing in any way from the spirit of the invention. Any such modifications are intended to be within the scope of the invention as defined by the following claims.

What is claimed is:

1. A mixture for covering waste piles comprising the following constituents:
    up to approximately forty five percent, by weight, liquid;
    a plurality, by weight, of a binder;
    a minority portion of cellulose fibers and plastic fibers sufficient to prevent erosion; and
    wherein a mixture of the constituents forms a thick viscid slurry capable of being sprayed in a uniform layer of approximately a quarter of an inch to form a daily or interim cover.

2. A mixture for covering waste piles comprising the following constituents:
    approximately thirty eight percent to forty five percent, by weight, liquid;
    approximately fifty four percent of sixty percent, by weight, binder;
    approximately one-half percent to two percent, by weight, cellulose fibers; and up to approximately one-tenth of a percent, by weight, plastic fibers; and wherein a mixture of the constituents forms a thick viscid slurry capable of being sprayed in a uniform layer of approximately a quarter of an inch to form a daily or interim cover.

3. The mixture for covering waste piles according to claims 1 or 2 wherein the liquid comprises water.

4. The mixture for covering waste piles according to claim 3 wherein the water comprises landfill leachate.

5. The mixture for covering waste piles according to claim 3 wherein the binder comprises cement kiln dust.

6. The mixture for covering waste piles according to claim 5 wherein the binder further comprises bentonite.

7. The mixture for covering waste piles according to claim 6 wherein the amount of Bentonite comprises approximately five percent, by weight.

8. The mixture for covering waste piles according to claims 1 or 2 wherein the binder comprises flyash.

9. The mixture for covering waste piles according to claim 8 wherein the binder further comprises portland cement.

10. The mixture for covering waste piles according to claim 9 wherein the amount of portland cement is about ten to fifteen percent, by weight.

11. The mixture for covering waste piles according to claims 1 or 2 wherein the cellulose fibers comprise shredded paper.

12. The mixture for covering waste piles according to claims 1 or 2 wherein the cellulose fibers comprise finely shredded wood fibers.

13. The mixture for covering waste piles according to claims 1 or 2 wherein the plastic fiber comprises polyethylene terephthalate fiber.

14. A mixture for covering waste piles comprising:
about thirty nine to forty five percent, by weight, water;
about fifty five to sixty percent, by weight, cement kiln dust;
about one-half to two percent, by weight, shredded paper;
up to about one-tenth percent, by weight, polyethylene terephthalate fibers; and
wherein the constituents form a mixture of a thick viscid slurry capable of being sprayed in a uniform layer of approximately a quarter of an inch to form a daily or interim cover.

15. A method of making cover for waste piles comprising:
mixing cellulose fibers and plastic fibers sufficient to prevent erosion with a liquid to form a pre-mixture; and
mixing a binder reagent to form a final mixture, wherein the final mixture forms a thick viscid slurry capable of being sprayed in a uniform layer of approximately a quarter of an inch to form a daily or interim cover.

16. The method of making a cover for waste piles according to claim 15 wherein the final mixture comprises:
about 39 to 45 percent, by weight, liquid:
about 54 to 60 percent, by weight, binder;
about ½ to 2 percent, by weight, cellulose fiber; and
up to about one-tenth of a percent plastic fibers.

17. The method of making a cover for waste piles according to claims 15 or 16 wherein the cellulose fibers and plastic fibers are mixed with the liquid in a mixing tank.

18. The method of making a cover for waste piles according to claims 15 or 16 wherein the liquid comprises water.

19. The method of making a cover for waste piles according to claims 15 or 16 wherein the cellulose fibers comprise shredded paper.

20. The method of making a cover for waste piles according to claims 15 or 16 wherein the plastic fibers comprise polyethylene terephthalate fiber.

21. The method of making a cover for waste piles according to claims 15 or 16 wherein the binder comprises cement kiln dust.

22. The method of making a cover for waste piles according to claim 21 wherein the binder further comprises Bentonite.

23. The method of making a cover for waste piles according to claims 15 or 16 wherein the binder comprises portland cement.

24. The method of making a cover for waste piles according to claim 23 wherein the binder further comprises flyash or stone dust.

25. A method of covering waste piles comprising:
mixing a binder, cellulose fibers and plastic fibers sufficient to prevent erosion, and liquid together to form a mixture of a thick viscid slurry capable of being sprayed in a uniform layer of approximately a quarter of an inch to form a daily or interim cover;
coating a waste pile with the mixture; and
allowing the coating of mixture to harden as a cover on the waste pile.

26. The method of covering waste piles according to claim 25 wherein mixing of a binder, cellulose fibers, plastic fibers and liquid comprises:
mixing the cellulose fibers and plastic fibers into a liquid;
thereafter, adding the binder thereto; and mixing.

27. The method of covering waste piles according to claim 26 further comprising mixing the fibers, liquid and binder within a mixing tank.

28. The method of covering waste piles according to claim 25 wherein coating a waste pile with the mixture comprises spraying the mixture on the waste pile.

29. The method of covering waste piles according to claim 25 wherein the cellulose fiber comprise shredded paper.

30. The method of covering waste piles according to claim 25 wherein the plastic fibers comprise polyethelene terephthalate.

31. The method of covering waste piles according to claim 25 wherein the binder comprises cement kiln dust.

32. The method of covering waste piles according to claim 31 wherein the binder further comprises bentonite.

33. The method of covering waste piles according to claim 25 wherein the binder comprises portland cement.

34. The method of covering waste piles according to claim 33 wherein the binder further comprises flyash or stone dust.

* * * * *

UNITED STATES PATENT AND TRADEMARK OFFICE
CERTIFICATE OF CORRECTION

PATENT NO. : 5,161,915

DATED : November 10, 1992

INVENTOR(S) : David L. Hansen

It is certified that error appears in the above-identified patent and that said Letters Patent is hereby corrected as shown below:

Column 7, line 48, after "making", insert --a--.

Signed and Sealed this

Fifth Day of October, 1993

Attest:

BRUCE LEHMAN

Attesting Officer     Commissioner of Patents and Trademarks